United States Patent Office 3,117,945
Patented Jan. 14, 1964

3,117,945
COMPOSITIONS COMPRISING STYRENE HOMO-
POLYMER AND STYRENE-ETHYLENE COPOLY-
MER AND METHOD THEREFOR
William F. Gorham, Berkeley Heights, and Alford G. Farnham, Mendham, N.J., assignors to Union Carbide Corporation, a corporation of New York
No Drawing. Filed Jan. 4, 1960, Ser. No. 36
9 Claims. (Cl. 260—45.5)

This invention relates to thermoplastic compositions comprising a copolymer and a homopolymer of styrene. More particularly, the invention relates to thermoplastic compositions which are more easily processable than styrene compositions heretofore known and which provide articles characterized by reduced brittleness and outstanding toughness.

Styrene homopolymer is generally produced by thermal or by free-radical polymerization of styrene monomer in the presence of free radical initiators or catalysts such as azo and peroxide compounds. The homopolymer has a number of highly desirable properties, such as high clarity, excellent moisture resistance and good rigidity which have given it a place of preeminence as an injection molding material and stimulated its widespread use for consumer and industrial products.

Not all the properties of styrene homopolymer are desirable, however. For example, styrene homopolymer is rigid to the point of being brittle and hence, exhibits little resistance to sharp blows and impact. Another disadvantage of styrene homopolymer is the limited number of ways in which it is feasible to mold or shape the polymer. For, while the homopolymer lends itself readily to injection molding, a lack of hot strength and a tendency to stick to calendering rolls precludes processing on such rolls or in extruders and, hence, narrows the range of shapes and structures available and restricts the use of the homopolymer with all its advantages to comparatively few fields and types of products.

A polymeric material offering most of the advantages of styrene homopolymer, but which is considerable less brittle, can be produced by copolymerizing styrene with ethylene. The copolymerization can be carried out by heating the monomers together, under slight positive pressure, in the presence of a catalyst. The styrene-ethylene copolymer thus produced, however, has a very high molecular weight as indicated by a 10 P melt flow at 250° C. of less than 2.0 decigrams per minute. As a result, the copolymer can not be calendered into useful sheets. A calendered sheet of styrene-ethylene copolymer is rough-surfaced, internally irregular, and nonuniform and generally unattractive and unsalable.

The broadening of the area of application of styrene homopolymer and copolymer has been retarded by their lack of adaptability to a variety of processing techniques and/or undue brittleness.

It is an object, therefore, of the present invention to provide a thermoplastic composition which is free of the limitations heretofore associated with styrene homopolymer and/or copolymer.

This and other objects of the present invention are achieved in general by thermoplastic compositions comprising styrene homopolymer in intimate admixture with styrene-ethylene gross copolymer. These thermoplastic compositions comprise 10 to 60 weight percent styrene homopolymer and 90 to 40 weight percent styrene-ethylene gross copolymer, and are readily processed by either calendering or extrusion methods. This feature is highly unexpected in view of the poor calendering and extrusion properties of the homopolymer and copolymer components individually.

The blends herein described, particularly those comprising 20 to 60 weight percent styrene homopolymer are excellent calendering materials which not only possess the requisite degree of hot strength on the rolls but which also are easily stripped from the rolls. These blended materials can be rolled into strong, tough, light, rigid sheet which is useful as formed or can be further shaped by vacuum forming or embossing techniques.

Also, the blends of this invention have a balance of properties which make them useful compositions for wire coating and similar extrusion applications. In particular, those blends comprising 10 to 40 weight percent styrene homopolymer exhibit remarkable abrasion resistance. This is highly surprising in view of the copolymer having only average abrasion resistance and the homopolymer being too brittle to test. The superiority in abrasion resistance of the blends over a conventional extrusion material, polyethylene, is shown in Table I below. A further advantage over polyethylene is shown in the resistance of the blends to thermal embrittlement.

TABLE I

*Abrasion Resistance and Thermal Embrittlement Characteristics of Polystyrene/Styrene-Ethylene Copolymer Blends and 0.95 Density Polyethylene*

| Material | Abrasion Resistance (cycles) | Thermal Stress Cracking (Days to Failure at 113°C.) |
|---|---|---|
| Copolymer (20% Styrene—74% Ethylene) | 45 | 1 |
| Polyethylene (0.95 density) | 9 | 12 |
| Blend: 60 parts Copolymer (27% Styrene, 73% Ethylene) and 40 parts Polystyrene | 175 | 60 |

In the present specification and claims the term "gross copolymer" refers to a styrene and ethylene copolymerization reaction product containing at least 20 weight percent copolymerized styrene and fractionable into several copolymer fractions, one of which is insoluble in toluene, heptane, chloroform and cyclohexane and comprises 50 to 75 weight percent of the gross copolymer. The term "copolymer fraction" is used to denote a portion of the gross copolymer, characterizable by solubility behavior, reduced viscosity and copolymerized styrene content at a given copolymerized styrene content for the gross copolymer.

The blends of styrene homopolymer and copolymer of the present invention can be prepared by any of the procedures ordinarily used to mix or compound polystyrene resin compositions. The styrene homopolymer and copolymer can be mixed or blended together in a differential-speed multi-roll mill, Marshall mill and like shear-producing apparatus. It is critical to carry out at least a portion of the mixing or shearing at a temperature high enough to flux the polymers, i.e., above about 140° C. without degradation, i.e., below about 300° C. Usually temperatures about 150° C. to 180° C. provide an adequately uniform, intimately admixed composition. Elevated temperature processing is conveniently carried out in a Banbury mixer or heated mill. It is practicable to combine the mixing and intimate blending and shearing operation with the forming operation in an apparatus such as a compounding extruder. The homopolymer and copolymer components can be blended by pumping one into the other while both are fluxed.

At the time of blending or at any other time, conventional additives, modifiers, colorants, lubricants, opacifiers, fillers and the like can be added to the composition of this invention.

The styrene homopolymers useful in the blends of the present invention are any of the commercially available atactic or isotactic polystyrenes having a molecular weight ranging from 40,000 to 150,000. Styrene homopolymer below about 40,000 in molecular weight is too brittle to be useful in blends with styrene-ethylene copolymer. Styrene homopolymers above about 150,000 are so viscous that fabrication of blends containing such homopolymer is extremely difficult. For maximum convenience in fabrication and the most desirable balance of physical properties in the blend, use of a styrene homopolymer having a molecular weight range from 50,000 to 70,000 is preferred.

The styrene-ethylene copolymers, which can be intimately admixed with the above styrene homopolymers to provide the advantageous compositions of the present invention, are narrowly critical. Only styrene-ethylene copolymers having properties as hereinafter set forth are useful in the blends of this invention.

The gross copolymers useful in the invention can be characterized by solubility characteristics in heptane, cyclohexane, chloroform and/or toluene. The gross copolymers useful in this invention are fractionably solubilizable into four fractions of varying copolymerized styrene content and varying solubility and reduced viscosity characteristics by successive extractions with the above-listed solvents and in that order.

The percent content of copolymerized styrene in these gross copolymers should be at least 20% by weight. From the standpoint of strength and general balance of properties imparted to the final blended composition, gross copolymers containing above about 20% to about 60% by weight copolymerized styrene and 80% to 40% by weight copolymerized ethylene are best suited for use in the compositions of this invention.

Particularly useful styrene-ethylene gross copolymers in our compositions are those made by copolymerizing styrene and ethylene with crystalline titanium trichloride (purple form) and a trialkyl aluminum compound having up to four carbon atoms in each alkyl group, as for example triisobutyl aluminum, suspended in an inert hydrocarbon solvent.

These styrene-ethylene gross copolymers are preferably prepared as follows:

To a solution of styrene monomer in an inert organic solvent is added a catalyst mixture consisting essentially of crystalline titanium trichloride (purple form) and a trialkyl aluminum compound wherein each of the alkyl groups contains up to four carbon atoms. The particle size of the crystalline titanium trichloride can be reduced to increase the catalytic activity, if desired.

The catalyst components are mixed in an approximately equimolar ratio, i.e., 1:2 to 2:1 of one to the other in an inert organic solvent. An equimolar ratio of crystalline $TiCl_3$ and triisobutyl aluminum suspended in heptane is preferred. The total amount of catalyst employed in the reaction can be varied from about 5 to about 40 millimoles of catalyst per liter of styrene/solvent solution. Catalyst concentration of about 20 millimoles per liter of a 20% by weight solution of styrene in cyclohexane is preferred.

Prior to addition of ethylene, the above-described styrene/solvent/catalyst reaction mixture is agitated rapidly, as by an impeller, and heated to a temperature of about 65-75° C. Ethylene is then sparged into the heated, agitated reaction mixture at a pressure of from about 2 to 10 pounds/sq. in. gauge, depending on the amount of copolymerized ethylene desired in the final product, with higher pressures providing gross copolymers having a higher copolymerized ethylene content. Ethylene addition is continued until the build-up of polymer, evidenced by a great increase in reaction mixture viscosity, makes agitation difficult. Under the reaction procedures set forth above, a period of seven to fourteen hours is generally sufficient to form a styrene-ethylene copolymer suitable for use in the compositions of the present invention.

The reaction is stopped by addition of an alcohol such as n-butanol in an amount approximately equal to the volume of the reaction mixture. Styrene and cyclohexane are removed from the reaction product by any suitable means, such as azeotropic distillation with n-butanol as a carrier. The resulting slurry of styrene-ethylene gross copolymer in n-butanol is filtered by centrifugation, washed with iso-propanol or the like and dried, suitably at atmospheric or reduced pressures and temperatures of about 70° C. for a period of about twelve hours.

Styrene-ethylene gross copolymers produced by the above-described reaction are usually extremely high molecular weight materials. To be suited to use in calendering, molding and extrusion apparatus, it is essential that the composition of this invention contain as the copolymer component, a styrene-ethylene copolymer having a "10 P"[1] melt flow of 1 to 10 decigrams per minute at 190° C. Lower melt flow copolymers are too stiff to be successfully incorporated in the blends. Melt flows higher than about 10 are characteristics of copolymers having insufficient toughness to be useful in the blends.

Copolymers of styrene and ethylene produced by the reaction hereinabove described which are so high in molecular weight as to not meet the above requirements for melt flow can be processed to meet these conditions by pyrolysis, such as in a hot tube or extruder at temperatures between 300° C. and 400° C. in order to partially decompose the copolymer in a controllable manner. In essence, this processing comprises a controlled reduction of molecular weight through thermal means and makes possible extrusion, molding and calendering of extremely high molecular weight products of certain polymerization reactions.

In order to illustrate the practice of our invention, the following examples are presented. All parts and percentages are by weight, unless stated otherwise.

EXAMPLE I

A. *Preparation of the styrene-ethylene copolymer.*—The apparatus was a 35 gallon stainless steel vessel equipped with a agitating propeller and a sparging tube. Into the apparatus was placed a solution of 36 pounds of styrene monomer in 144 pounds of cyclohexane. A catalyst consisting of 100 grams of crystalline titanium trichloride and 200 grams of triisobutyl aluminum was added. Agitation at a speed of 150-200 r.p.m. and heating was then begun. When a temperature of 65-75° C. was reached, ethylene was sparged into the vessel beneath the surface of the styrene solution under a pressure of 2-4 pounds/sq. in. gauge. Ethylene addition was continued in this manner for nine hours with the temperature maintained at 70° C. Total ethylene charged during this period was 13.25 pounds.

To stop the reaction 150 pounds of n-butanol was added to the reaction mixture. The unreacted styrene, cyclohexane and n-butanol were distilled off as an azeotrope at atmospheric pressure. The slurry of styrene-ethylene copolymer in n-butanol remaining after the distillation, was centrifuged and the obtained copolymer precipitate was washed with isopropanol. The washed copolymer was spread on trays and dried in a vacuum oven (30 mm. Hg) at 70° C. for twelve hours. The yield was 21.9 pounds of gross styrene-ethylene copolymer which had a styrene content of 50% by infrared analysis.

B. *Properties of the copolymer.*—Samples of the opaque, white styrene-ethylene copolymer were injection molded using a cylinder temperature of 500° F., a mold temperature of 150° F. and a pressure of 1000 pounds/sq. in. gauge. Mechanical properties were tested. The data appear in Table II below.

Other samples of the styrene-ethylene copolymer were heated to 375° C. in a hot tube to a 10 P melt flow at 190° C. of 3.1 decigrams per minute. These processed

---

[1] "10 P" melt flow is a standard test for indicating molecular weight of plastics and is described under ASTM designation #1238-57T.

samples were injection molded using a cylinder temperature of 450° F., a mold temperature of 150° F., and 1000 pound/sq. in. gauge pressure. Mechanical properties were tested. The data also appear in Table II below.

TABLE II

| Test | ASTM No. | Copolymer | Processed Copolymer |
|---|---|---|---|
| Tensile Strength, p.s.i. | D-638-52T | 3,720 | 3,890 |
| Tensile Modulus, p.s.i. | 1% secant | 110,000 | 127,000 |
| Elongation at Break, percent | D-638-52T | 54 | 70 |
| Izod Impact Strength at 77° F. (ft.-lb./inch of notch) | D-256-54T | 3.67 | 16.2 |
| Heat Distortion Temperature, °C. | D-648-45T | 60 | 63 |

C. *Preparation of copolymer-homopolymer blend.*—Seventy-five parts of the above processed copolymer and twenty-five parts of a styrene homopolymer (M.W. 70,000) were blended by milling on a differential-speed two-roll mill at a temperature of 160° C. for about 10 minutes to a smooth, opaque, white sheet. The sheet was cooled to room temperature and granulated into pellets. Samples of the copolymer-homopolymer composition were injection molded using a cylinder temperature of 430° F. and a mold temperature of 150° F. The molded material was tested for mechanical properties and results were as follows:

TABLE III

Test: Blend
Tensile strength, p.s.i. ------------------ 4,730
Tensile modulus, p.s.i. ------------------ 253,000
Elongation at break, percent ----------- 24
Izod impact at 77° F. ------------------ 3.15
Heat distortion temperature, °C. ------ 76.6

EXAMPLE II

The procedure and proportions of Example I were used except that the ethylene was sparged into the reaction vessel at a 7 to 9 pounds/sq. in. gauge pressure rather than 2 to 4 and for 12 hours rather than 9, as in Example I. As a result, the weight of ethylene charged was 18 pounds rather than 13.25.

The yield of styrene-ethylene copolymer from this reaction was 29.6 pounds. Analysis by infrared techniques showed the copolymer to have a copolymerized styrene content of 40% by weight. Samples of the copolymer were injection molded without further processing, and also after heat treating the copolymer in a hot tube at 365° C. to reduce the molecular weight so that 10 P melt flow at 190° C. was 3.1 decigrams per minute.

The samples of unprocessed material were molded using a cylinder temperature of 500° F., a mold temperature of 150° F. and 1,200 pounds/sq. in. gauge pressure. The heat treated or processed material was molded using a lower cylinder temperature, 450° F., and lower pressures 1,000 pounds/sq. in. gauge. Sixty parts by weight of the processed copolymer was blended with 40 parts by weight of polystyrene (M.W. 70,000) and the sample injection molded at 430° F. and 1,000 p.s.i. gauge. Mechanical properties of the samples were tested with the following results:

TABLE IV

| | Unprocessed | Processed | Blend |
|---|---|---|---|
| Tensile Strength, p.s.i. | 2,200 | 3,820 | 5,040 |
| Tensile Modulus, p.s.i. | 85,000 | 114,000 | 218,000 |
| Elongation, percent | 100 | 216 | 35 |
| Izod Impact | 9.3 | 19.6 | 10 |
| Heat Distortion Temperature, °C. | | 52 | 75 |

EXAMPLE III

The procedure and proportions of Example I were used except that the ethylene was sparged into a styrene solution maintained at 65° C. for 14 hours under a pressure of 2–4 pounds/sq. in. gauge. Total weight of ethylene added was 18 pounds. The yield of copolymer was 22 pounds. Copolymerized styrene content of this copolymer was 30%.

A portion of the gross copolymer was reduced in molecular weight by heating to 363° C. (in a hot tube) to a 10 P melt flow, at 190° C. of 3.5 decigrams per minute.

Two blends were prepared with polystyrene (M.W. 70,000) in the manner of Example I. The first blend had a 60:40 gross copolymer to homopolymer ratio; the second had a 50:50 ratio of the components. Samples of each of these blends and the unprocessed and processed copolymer were injection molded and tested for mechanical properties. The results are summarized in Table IV below. Molding conditions for each of the samples are given below the table.

TABLE V

| | (1) Unprocessed | (2) Processed | (3) 60:40 Blend | (4) 50:50 Blend |
|---|---|---|---|---|
| Tensile Strength, p.s.i. | 2,030 | 3,350 | 4,820 | 5,340 |
| Tensile Modulus, p.s.i. | 55,000 | 91,000 | 227,000 | 260,000 |
| Elongation, percent | 146 | 251 | 41 | 22 |
| Izod Impact | 14.9 | 20.4 | 8.9 | 6.7 |
| Heat Distortion Temperature, °C. | | | 80.0 | 82.8 |

(1) Sample molded at 500° F. cyl. temp., 150° F. mold temp., 1200 p.s.i.g.
(2) Sample molded at 470° F. cyl. temp., 150° F. mold temp., 1200 p.s.i.g.
(3) Sample molded at 430° F. cyl. temp., 150° F. mold temp., 1000 p.s.i.g.
(4) Sample molded at 430° F. cyl. temp., 150° F. mold temp., 980 p.s.i.g.

EXAMPLE IV

Additional blends of styrene homopolymer and styrene-ethylene copolymer were prepared using varying amounts of copolymer and of varying copolymerized styrene content. The blends were calendered using ½% zinc stearate and ½% stearic acid as lubricants. Excellent quality sheet in thicknesses from 4 to 30 mils was obtained. This sheeting was readily embossed with either shallow or deep patterns. Vacuum forming with either male or female forms into a number of shapes, e.g., milk bottle tops, ice cube trays, flower pots, etc. was easily accomplished. Some of the sheeted stock was block printed with gravure and flexographic ink without need for pretreatment. The blend compositions and their properties are given below.

TABLE VI

Styrene Ethylene Copolymer Calendered Sheet Properties

| Percent Copolymer in Blend [1] | Percent Styrene in Copolymer | Percent Polystyrene in Blend [2] | Tensile Strength (p.s.i.) | Tensile Modulus (p.s.i.) | Elongation at Break (percent) | Tensile Impact Strength (ft. lbs./in.)[3] |
|---|---|---|---|---|---|---|
| 70 | 41 | 30 | 4,600 | | 60 | 43 |
| 60 | 26 | 40 | 3,100 | 123,000 | 38 | 44 |
| 60 | 33 | 40 | 4,000 | | 60 | 64 |
| 50 | 33 | 50 | 4,800 | | 30 | 25 |

[1] Copolymers hot-processed to 10 P melt flow @ 190° C. of 3.0–3.5 decigrams per minute.
[2] Molecular weight 60,000.

To demonstrate the fractionable nature of the gross styrene-ethylene copolymers useful in the compositions of the present invention each of the gross copolymers of Examples I–III was fractionated by a successive extraction technique into four copolymers A, B, C and D. The extraction was carried out by placing a 5.00 gram sample of each gross copolymer in a thimble filter suspended below a reflux condenser attached to a 250 ml. flask containing 100 ml. of the desired solvent. The vapors of the boiling solvent passed around the thimble filter, were condensed in the condenser and dripped back into the flask through the sample. Thus, the extracted copolymer collects in the flask, as fresh solvent vaporizes to continue the extraction. Extraction was carried out with each solvent for a period of 24 hours, after which the extracted polymer was precipitated by addition of methanol to the solution. After filtering, washing with isopropanol and drying at reduced pressure (30 mm. Hg) at 70° for twelve hours, the copolymer was analyzed for copolymerized styrene content by infrared methods. Extractions of each sample were carried out successively with heptane, cyclohexane, and chloroform. Amounts of copolymer extracted with each of the solvents are given below in Table VI.

TABLE VII

| Example | Percent Styrene in Copolymer | Percent Soluble Copolymer | | | Percent Insoluble Copolymer |
|---|---|---|---|---|---|
| | | (A) | (B) | (C) | (D) |
| 1 | 50 | 13 | 31 | 26 | 26 |
| 2 | 40 | 6 | 10 | 17 | 67 |
| 3 | 30 | 4 | 7 | 17 | 74 |

| Fraction | Reduced Viscosity (Toluene) | Percent Styrene | Heptane | Cyclohexane | Chloroform |
|---|---|---|---|---|---|
| A | 0.6–1.2 | 40–55 | Soluble | Soluble | Soluble. |
| B | 1.0–1.8 | 75–90 | Insoluble | do | Do. |
| C | 2.0–4.0 | 90–100 | do | Insoluble | Do. |
| D | | 10–20 | do | do | Insoluble. |

Preferred gross copolymers in terms of copolymerized ethylene content and the fractions present therein are those containing from 25 to 40% by weight copolymerized styrene and which have from 7 to 11% by weight of "A" fraction copolymer (soluble in heptane, cyclohexane, chloroform and toluene); from 7–15% by weight of "B" fraction copolymer (soluble in cyclohexane, chloroform and toluene and insoluble in heptane); from 12 to 20% by weight of "C" fraction copolymer (soluble in chloroform and toluene and insoluble in heptane and cyclohexane); and from 50–75% by weight of "D" fraction copolymer, soluble in ethylbenzene and chlorobenzene and insoluble in heptane, cyclohexane, chloroform and toluene. The use of the gross copolymer rather than one or more fractions thereof only is critical in achieving the advantageous properties of the blends of the invention. Use of toluene soluble fractions only blended with polystyrene results in brittle, unworkable compositions. On the other hand, use of the toluene insoluble fraction only is not feasible since that fraction is not compatible with polystyrene.

The blended compositions of this invention are useful for a wide variety of articles ranging from toys, small containers and tubing, to decorative sheeting. Ease of fabrications by a number of standard methods into articles having a desirable balance of properties is an outstanding characteristic of our invention.

What is claimed is:

1. A readily processable thermoplastic composition comprising per 100 parts by weight from 10 to 60 parts by weight of styrene homopolymer with a molecular weight of from 40,000 to 150,000 blended with from 90 to 40 parts by weight of a fractionable styrene-ethylene copolymer having a 10 P melt flow at 190° C. of from 1 to 10 decigrams per minute and containing at least 20% copolymerized styrene, one fraction of said copolymer being insoluble in toluene and comprising from 50 to 75% by weight of said copolymer.

2. A readily processable thermoplastic composition comprising per 100 parts by weight from 20 to 60 parts by weight of styrene homopolymer with a molecular weight of from 40,000 to 150,000 blended with from 80 to 40 parts by weight of a fractionable styrene-ethylene copolymer having a 10 P melt flow at 190° C. of from 1 to 10 decigrams per minute and containing from 20 to 60% copolymerized styrene, one fraction of said copolymer being insoluble in toluene and comprising from 50 to 75% by weight of said copolymer; a second fraction insoluble in heptane and cyclohexane and soluble in chloroform and toluene; a third fraction insoluble in heptane and soluble in cyclohexane, chloroform and toluene; and a fourth fraction soluble in heptane, cyclohexane, chloroform and toluene.

3. A readily processable thermoplastic composition comprising per 100 parts by weight from 10 to 40 parts by weight of styrene homopolymer with a molecular weight of from 40,000 to 150,000 blended with from 90 to 60 parts by weight of a fractionable styrene-ethylene copolymer having a 10 P melt flow at 190° C. of from 1 to 10 decigrams per minute and containing from 20 to 60% copolymerized styrene, one fraction of said copolymer being insoluble in toluene and comprising from 50 to 75% by weight of said copolymer; a second fraction insoluble in heptane and cyclohexane and soluble in chloroform and toluene; a third fraction insoluble in heptane and soluble in cyclohexane, chloroform and toluene; and a fourth fraction soluble in heptane, cyclohexane, chloroform and toluene.

4. The composition claimed in claim 3 wherein the copolymerized styrene content of the copolymer is from 30 to 50% by weight.

5. Method for producing readily processable thermoplastic compositions which includes the step of blending a fractionable styrene-ethylene copolymer having a 10 P melt flow at 190° C. of from 1 to 10 and containing from 20 to 60% by weight copolymerized styrene with styrene homopolymer having a molecular weight of from 40,000 to 150,000 in a ratio per 100 parts by weight of the blend of from 90 to 40 parts by weight of the copolymer to from 10 to 60 parts by weight of said styrene homopolymer under shearing conditions at a temperature above about 140° C. and below the degradation temperature of the blended polymers.

6. The method claimed in claim 5 wherein from 80 to 40 parts by weight of said copolymer is blended with from 20 to 60 parts by weight of said styrene homopolymer.

7. The method claimed in claim 5 wherein from 90 to 60 parts by weight of said copolymer is blended with from 10 to 40 parts by weight of said styrene homopolymer.

8. The method claimed in claim 7 wherein the said styrene homopolymer has a molecular weight of from 50,000 to 70,000, and is blended with said copolymer under shearing conditions at a temperature between about 150° C. and 180° C.

9. Method for producing readily processable thermoplastic compositions which comprises fluxing together 10 to 60 parts by weight of styrene homopolymer having a molecular weight between 40,000 and 150,000 and 90 to 40 parts by weight of copolymer of styrene and ethylene which has a 10 P melt flow between 1 and 10 at 190° C. and contains 20 to 60% copolymerized styrene, said copolymer being fractionable into a first copolymer fraction insoluble in toluene and comprising 50 to 75% by weight of the copolymer; a second copolymer fraction insoluble in heptane and cyclohexane and soluble in chloroform and toluene; a third copolymer fraction insoluble in heptane and soluble in cyclohexane, chloroform and toluene; and a fourth copolymer fraction soluble in heptane, cyclohexane, chloroform and toluene.

References Cited in the file of this patent

UNITED STATES PATENTS

| 2,563,631 | Young et al. | Aug. 7, 1951 |
| 2,994,691 | Gates | Aug. 1, 1961 |

FOREIGN PATENTS

| 538,782 | Belgium | Dec. 6, 1955 |